J. MISKEY.
AUTOMOBILE LAMP CONTROL MECHANISM.
APPLICATION FILED JAN. 4, 1919.

1,314,281.

Patented Aug. 26, 1919.
3 SHEETS—SHEET 1.

Julius Miskey
INVENTOR

BY R. J. McCarty.
his ATTORNEY.

J. MISKEY.
AUTOMOBILE LAMP CONTROL MECHANISM.
APPLICATION FILED JAN. 4, 1919.
1,314,281.
Patented Aug. 26, 1919.
3 SHEETS—SHEET 2.
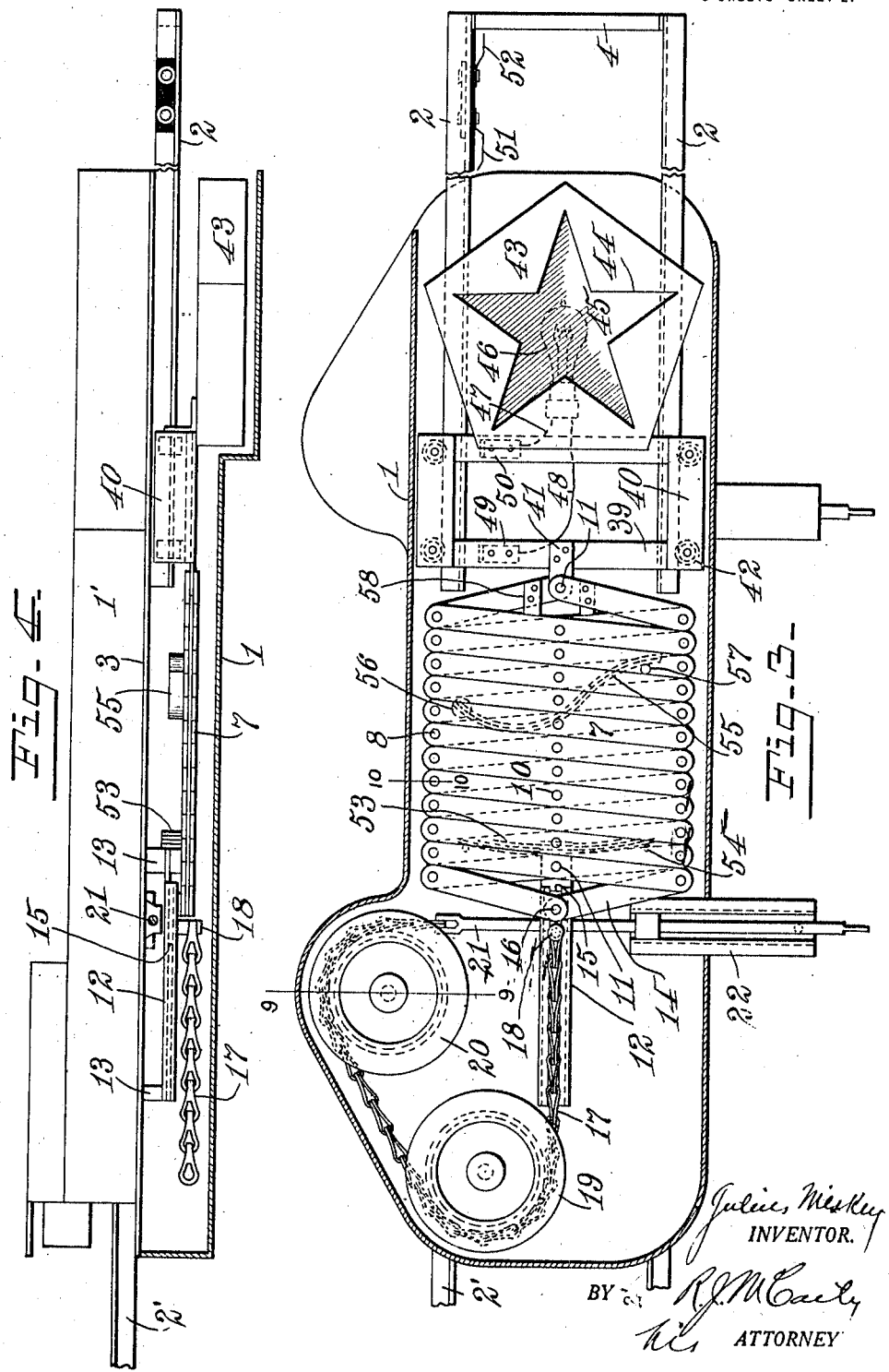

J. MISKEY.
AUTOMOBILE LAMP CONTROL MECHANISM.
APPLICATION FILED JAN. 4, 1919.
1,314,281.
Patented Aug. 26, 1919.
3 SHEETS—SHEET 3.
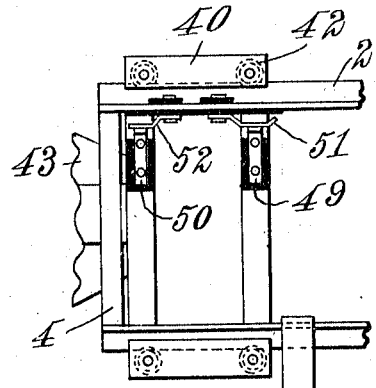
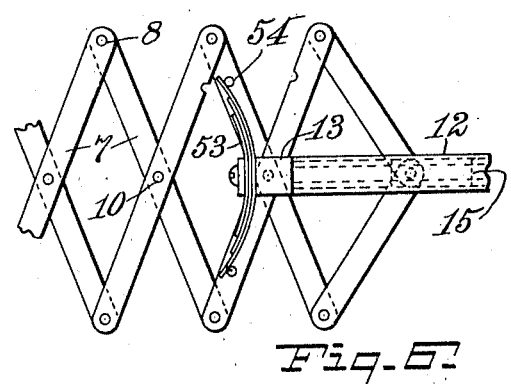
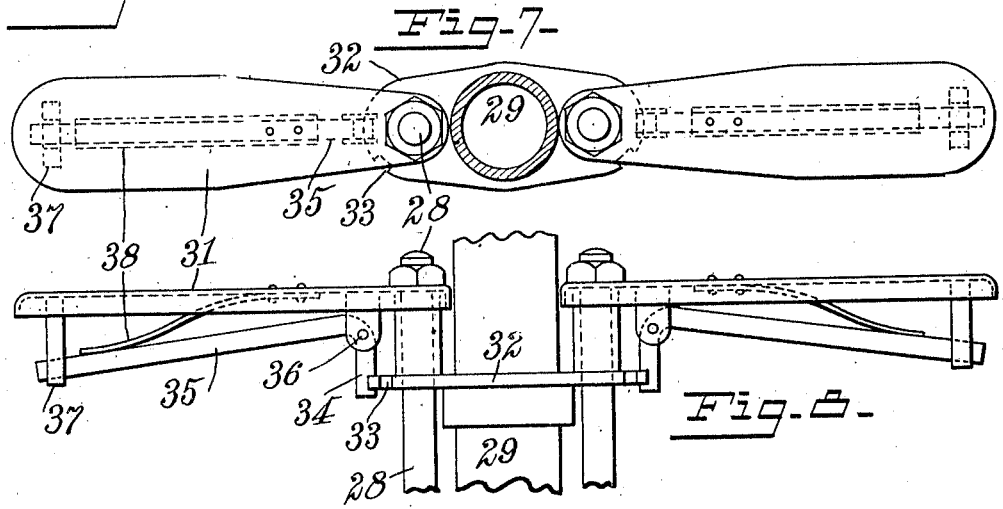
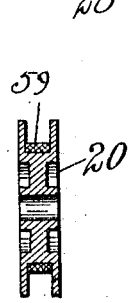
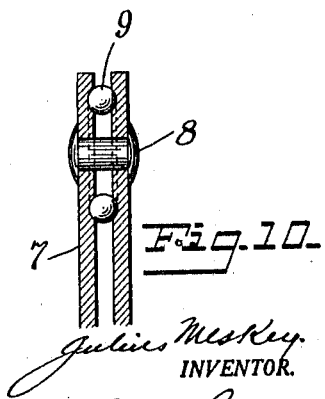

UNITED STATES PATENT OFFICE.

JULIUS MISKEY, OF DAYTON, OHIO.

AUTOMOBILE-LAMP-CONTROL MECHANISM.

1,314,281. Specification of Letters Patent. Patented Aug. 26, 1919.

Application filed January 4, 1919. Serial No. 269,567.

*To all whom it may concern:*

Be it known that I, JULIUS MISKEY, a citizen of Hungary, residing at Dayton, in the county of Montgomery and State of Ohio, have invented certain new and useful Improvements in Automobile-Lamp-Control Mechanism, of which the following is a specification.

This invention relates to improvements in light control mechanism for automobiles.

The object of the invention is to provide means for controlling the lights of automobiles in such a manner as to cause a ready observance of the lights by pedestrians as well as the occupants of other automobiles. The control mechanism moves the lamps on one or other side of the automobile to indicate the turns either to one or the other side and the mechanism includes means that are operated from the driver's seat to cause a light to appear on one or the other side of the automobile and at the front thereof to indicate the direction in which the machine is going to turn.

Figure 1:
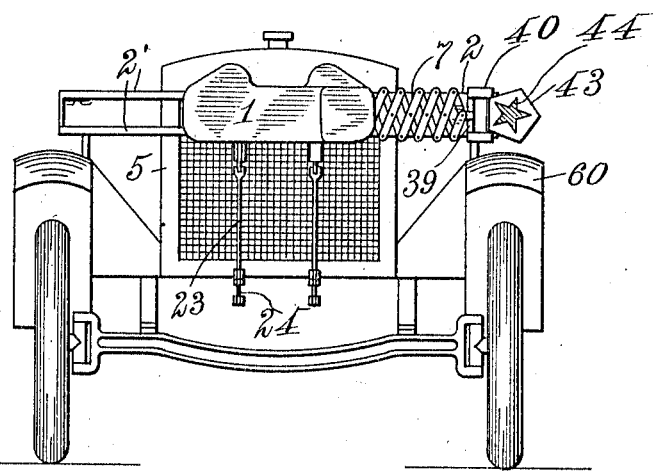
Figure 2:
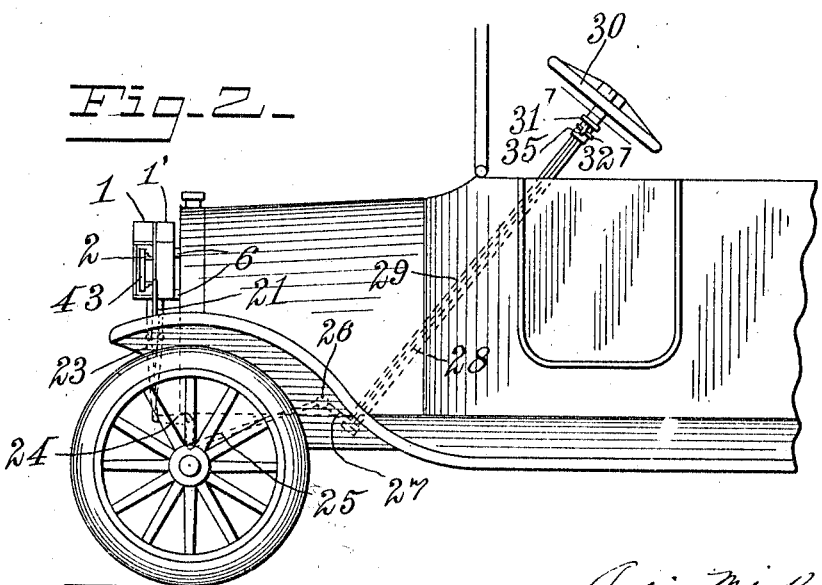

In advance of a more particular description of the invention reference is made in general terms to the accompanying drawings of which Figure 1 is an elevation of the front end of an automobile to which my improved light control mechanism is applied. Fig. 2 is a side elevation of the front end of an automobile having said light control mechanism applied. Fig. 3 is a detached view of the light control mechanism which operates the lamp on one side, the mechanism for operating the lamp on the other side being a duplicate of that shown in Fig. 3. Fig. 4 is a top plan view of the mechanism shown in Fig. 3. Fig. 5 is a detail view of the outer end of one pair of the tracks and which are included in the mechanism shown in Fig. 3 and which operates in connection with the lamp on one side. Fig. 6 is a detail view of a portion of the lazy tongs which is included in the mechanism shown in Fig. 3. Fig. 7 is an enlarged sectional view on the line 7—7 of Fig. 2 showing the hand operated levers which are operated to expand the system of levers or lazy tongs when it is desired to show the light on one or the other side of the machine. Fig. 8 is a side view of Fig. 7. Fig. 9 is a sectional view of one of the pulleys shown in Fig. 3 and on the line 9—9 thereof and Fig. 10 is a detail sectional view showing the bearing of one end of a pair of levers of the lazy tongs, this view being on the line 10—10 of Fig. 3.

In a detail description of my invention similar reference characters indicate corresponding parts in the several views of the drawings as well as the description.

The lamp control mechanism is inclosed in suitable casings 1—1' from the opposite ends of which extend two sets of tracks 2—2' said tracks being rigidly united to the back 3 of the casings. The tracks are united by bars 4 which support the outer ends of each pair of tracks. The casings 1—1' with their extended tracks 2—2' are mounted in the front of the automobile radiator 5 in any suitable manner. As shown in Fig. 2 the means for mounting said casings and tracks in a horizontal position consists of upper and lower brackets 6—6 which securely hold the said casings and tracks in a horizontal position as shown in Fig. 1. Referring to Fig. 3 the mechanism there shown is duplicated, one set of said mechanism being employed in casing 1 for the light on one side of the automobile and one set in casing 1' for the other side. It will therefore be necessary to describe one side of such light control mechanism only, but referring to Fig. 4 briefly the other casing 1' lies in the rear of the casing 1 and is supported by the same back wall 3. Within this casing 1' is the same set of mechanism as disclosed in Fig. 3 or rather a similar set of mechanism as well as tracks 2'—2' projecting from the end thereof. The duplicated mechanism consists of an assemblage of levers 7 comprising a lazy tongs said levers being pivotally connected at the ends by rivets 8 and in the centers by rivets 10. Between the ends of each of said levers balls 9 are inclosed in suitable cavities to provide antifriction bearings at the ends of the lever to facilitate a free and easy movement in the opening and closing thereof. All of the pivots 10 at the centers of the levers move as the system of levers is expanded or contracted. The two levers adjacent to the inner extreme end levers are, however, pivoted by a pin or rivet 11 which is fixed in its position by being secured to a guide 12 which guide is secured to two posts 13—13 on the back 3 of the casing at its ends. The two inner extreme levers 14 are pivoted at 16 to a slide 15 in said guide 12 and to which one end of a chain 17 is connected by means of a button or head 18 which is secured to said slide 15.

The chain 17 passes around a pulley 19 and an upper pulley 20 said pulleys being mounted in the end of the track frame 2. The said pulleys have the grooves incased with rubber 59 as shown in Fig. 9. The end of the chain 17 which passes over the upper pulley 20 is connected with a depending rod 21 which passes through a guide 22 secured to casing 1 and connects below the guide 22 with a rod 23. The lower end of the rod 23 connects with a bell-crank lever 24 which is pivoted to the chassis of the machine. The lower arm of the bell-crank lever 24 is connected with a rod 25 having a universal connection 26 at its upper end with a crank arm 27. See Fig. 2. The crank arm 27 is connected with the lower end of an operating rod 28 which extends up alongside the steering post tube 29 and is connected below the steering wheel 30 to a lever 31. See Fig. 7. The lever 31 is turned from the position shown in Fig. 7 in operating the lazy tongs to extend the lamp to the outward position. A bearing in the form of a plate 32 is secured to the steering post tube 29 below the steering wheel and immediately below the lever 31. In this plate 32 there is a notch or recess 33. The downwardly extended end 34 of a latch 35 coöperates with said notch said latch being pivoted at 36 below the lever 31 and having its outer end confined within a keeper 37 which projects from the under side of the lever 31 near the end of said lever. Between this lever 35 and the lever 31 there is a plate spring 38 one end of which is secured to the under side of the lever 31 and the free end of which normally presses the lever 35 in a manner to cause the end 34 thereof to enter the notch 33 in the plate 32. When the lever 35 thus engages the notch 33 the lazy tongs shown in Fig. 3 is open or expanded. The end of the lazy tongs opposite that connected to the chain 17 is connected with a carriage consisting of vertical bars 39 and end cross bars 40, the connection between the outer end of the lazy tongs and carriage thus formed being by means of a plate 41 which is connected to one of the bars 39 of the carriage and the center of the outermost links of the lazy tongs by a rivet 11 which forms a pivot. Two rollers 42 are mounted at each end of the carriage and these rollers travel along the tracks 2 when the lazy tongs is expanded or contracted. Secured to the outer end of the carriage so consisting of the parts 39 and 40 is a lamp housing 43 the front face of which has an opening, in the present case an opening 44 in the form of a star which is closed by a glass plate 45 which may be colored, for example red or green, and behind this glass plate 45 an incandescent lamp 46 is placed, the same being shown in dotted lines in Fig. 3. The said lamp is connected by means of circuit wires 47 and 48 to contact members 49 and 50 which are secured to the vertical bars 39 of the carriage. At the outer end of the tracks 2 there are contact members 51 and 52 which connect in the electrical circuit of the automobile which it has not been deemed necessary to illustrate because of its well-known use in automobile service. It will be understood that as the lamp 46 is moved outwardly by the carriage through the expansion of the lazy tongs the contact members 49 and 50 will make contact with members 51 and 52 thus completing the lighting circuit. At this time the lever 31, Fig. 7, is locked in the notch 33. The light remains in service during this period and until the lever 35 is released from engagement with the bearing plate 32. At this time the lazy tongs is contracted to the position shown in Fig. 3 and the contacts between points 49, 50, 51 and 52 are broken. The lazy tongs or system of levers is closed or contracted by means of springs one of which to-wit 53, consisting of a number of leaves or plates placed one against the other and secured at its center to one of the pivots 10. The ends of this spring 53 bear against pins 54 secured to the two next adjacent levers. The leaf spring 55 is secured at 56 to one of the levers 7 and bears against a pin 57 on one of the other levers. When the lazy tongs are expanded these springs are stored with energy owing to their engaging the pins on the levers, and when the lever 35, Fig. 8, is released from the notch 33 the force of the springs 53 and 55, moving to their normal conditions, will close the lazy tongs and draw in the lamp. It will be seen from Fig. 1 of the drawings that the tracks 2—2' extend outwardly on each side of the radiator 5 and the lamp on each side is moved to a position above the fender 60 of the automobile. It therefore follows that the lamp is not projected out beyond the width of the automobile but is confined within the limits of its width so that there is no danger of the lamp or the attachment coming in contact with any obstruction that would tend to damage the same or render it inoperative. In order to prevent the two outermost levers 7 of the system closing entirely upon the two adjacent levers when the system is contracted I provide two stops 58 which are attached to the two outermost levers and are projected inwardly to engage the two inner adjacent levers when the system is closed sufficiently to cause such engagement. As shown in Fig. 3 the two outermost levers are held apart from the adjacent levers by this means and owing to this the system is more easily expanded and without any interruption when the lever 31, Fig. 7 is moved to the position to cause the latch 35 to engage the notch 33, during which the chain pulls on the outer end of the lazy tongs.

Having described my invention I claim:

In a lamp control mechanism, a casing having double tracks extended from the outer end thereof and a single track at the inner end, a lazy-tongs within said casing, a carriage mounted on said double track and connected to the outer end of the said lazy-tongs, a housing mounted on said carriage, a slide connected to the inner end of said lazy-tongs and movable on the single track, a chain connected to said slide for actuating the lazy-tongs to extend the same, and leaf springs mounted on said lazy-tongs for retracting the same.

In testimony whereof I affix my signature.

JULIUS MISKEY.